July 3, 1962 G. DIRKS 3,042,901

DISTRIBUTOR-CONTROLLED MAGNETIC STORAGE UNIT

Filed March 30, 1955 11 Sheets-Sheet 1

INVENTOR
Gerhard Dirks
BY Michael S. Striker
agt.

INVENTOR
Gerhard Dirks
BY Michael S. Striker
agt.

July 3, 1962 G. DIRKS 3,042,901

DISTRIBUTOR-CONTROLLED MAGNETIC STORAGE UNIT

Filed March 30, 1955 11 Sheets-Sheet 3

INVENTOR
Gerhard Dirks
BY
Michael S. Striker
agt.

INVENTOR
Gerhard Dirks
BY Michael S. Striker
agt.

INVENTOR
Gerhard Dirks
BY
Michael S. Striker
agt

July 3, 1962 G. DIRKS 3,042,901

DISTRIBUTOR-CONTROLLED MAGNETIC STORAGE UNIT

Filed March 30, 1955 11 Sheets-Sheet 6

INVENTOR
Gerhard Dirks
BY
Michael S. Striker
agt.

July 3, 1962 G. DIRKS 3,042,901

DISTRIBUTOR-CONTROLLED MAGNETIC STORAGE UNIT

Filed March 30, 1955 11 Sheets-Sheet 7

INVENTOR
Gerhard Dirks
BY Michael S. Striker
agt.

INVENTOR
Gerhard Dirks
BY
Michael S. Striker
agt.

July 3, 1962 G. DIRKS 3,042,901

DISTRIBUTOR-CONTROLLED MAGNETIC STORAGE UNIT

Filed March 30, 1955 11 Sheets-Sheet 9

INVENTOR
Gerhard Dirks
BY
Michael S. Striker
agt.

INVENTOR
Gerhard Dirks
BY
Michael S. Striker
agt.

July 3, 1962 G. DIRKS 3,042,901

DISTRIBUTOR-CONTROLLED MAGNETIC STORAGE UNIT

Filed March 30, 1955 11 Sheets-Sheet 11

INVENTOR
Gerhard Dirks
BY
Michael S. Striker
agt.

3,042,901
Patented July 3, 1962

3,042,901

DISTRIBUTOR-CONTROLLED MAGNETIC STORAGE UNIT

Gerhard Dirks, 44 Morfelder Landstrasse W., Frankfurt am Main, Germany

Filed Mar. 30, 1955, Ser. No. 498,048
Claims priority, application Germany Oct. 1, 1948
3 Claims. (Cl. 340—172.5)

This application is a continuation-in-part of patent application No. 101,032, filed June 24, 1949, now abandoned.

The invention relates to storage devices with which the recording, sensing and erasing of signals is effected by signal heads.

The present invention provides a selective magnetic storage means comprising a magnetizable signal carrier in the form of a tape or wire, and signal sensing and/or recording means therefor, with a relative cyclic movement between such signal carrier and said signal sensing and/or recording means, each cycle of such movement being a movement of a predetermined extent lengthwise and/or transversely of the signal carrier, such as, for example, for the traversing of one or more "storage areas" of the tape, and comprising also means whereby signals may be transferred selectively to and from the signal carrier by said sensing and recording means. The aforementioned cyclic movement is preferably a stepwise one and is sufficient to traverse a given number of denomination areas within one storage area.

According to another feature of the invention, signals sensed from a tape or wire may be transferred selectively to another storage means, such as, for example, a magnetizable drum, disc or tape, between which and the sensing and/or recording means there is a cyclic movement by which if necessary a repeated sensing of the signals may be effected. Such other storage may be as set out in my copending patent application, Serial No. 498,047, filed March 30, 1955, and now abandoned.

The sensing and/or recording means will include at least one signal head but usually there will be a plurality of signal heads and these will be displaced relatively to each other, such as, for example, lengthwise or transversely of the signal carrier.

There may be also a sensing means for synchronizing signals and such synchronizing signals may be recorded as remanent or permanent signals on the signal carrier. The synchronizing signals may be magnetizably recorded, or they may be recorded optically or photographically. Further, selecting means may be provided including distributing means operating under the control of such synchronizing signals, and such distributing means may be an electrically actuating or electronically actuating distributing means.

The selecting means for selective transfer of signals between the signal carrier and the sensing or recording means may be adapted for operation in dependence on a selection program of any kind, including those adapted for handling addresses, information, control and/or selection signals and auxiliary or supplementary signals.

In order that the present invention may be readily carried into effect, it will now be described with reference to the accompanying drawing, wherein.

Figure 6B:
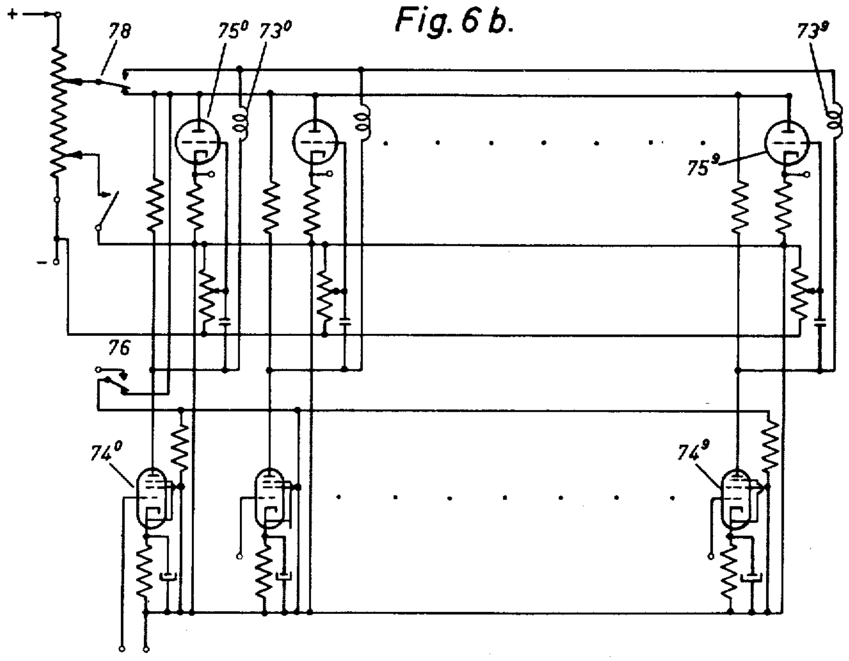
Figure 6A:
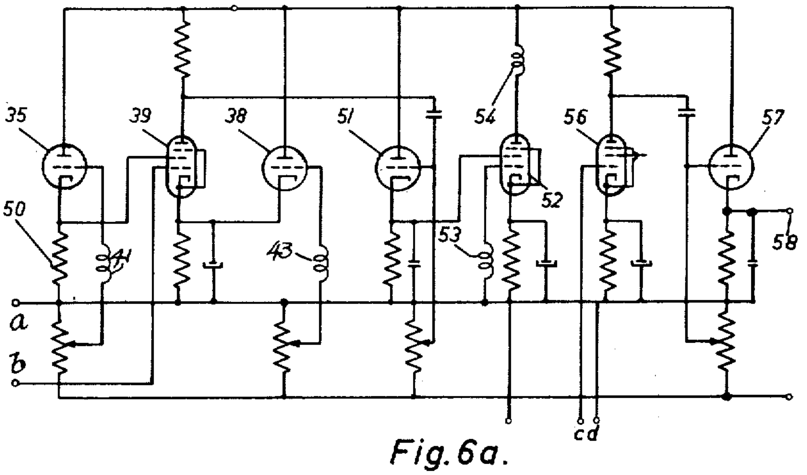
Figure 7:
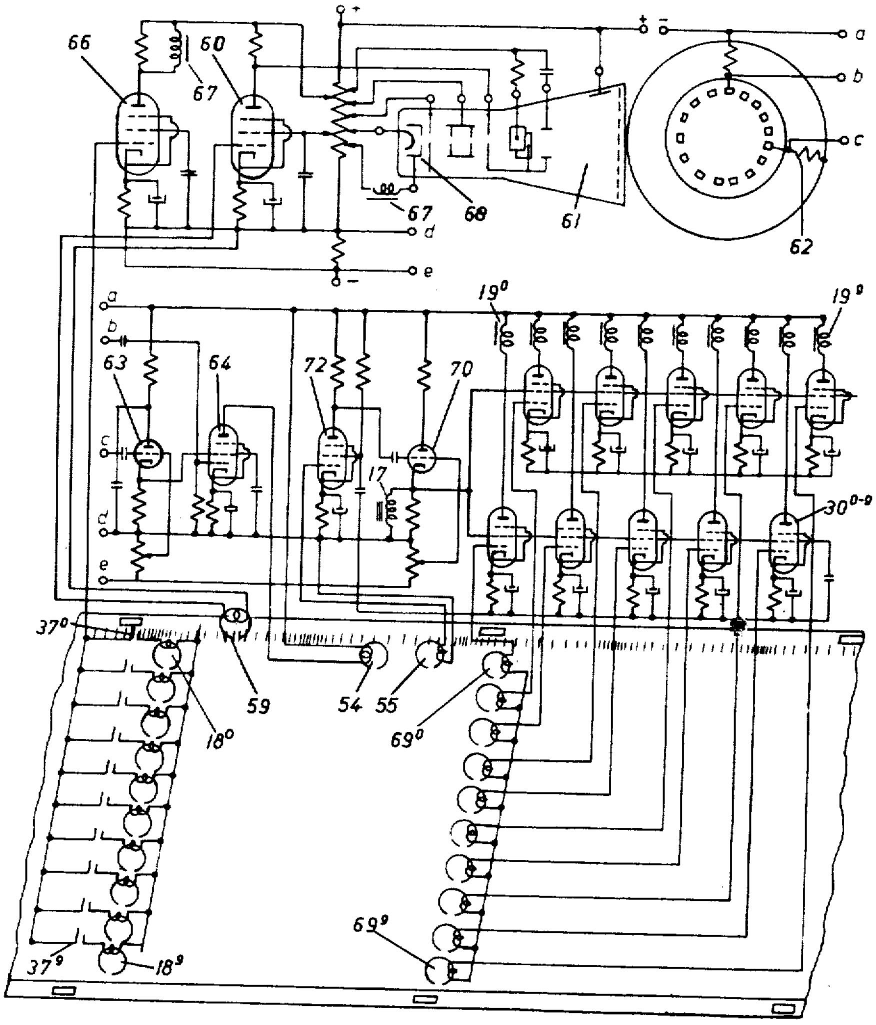
Figure 8:
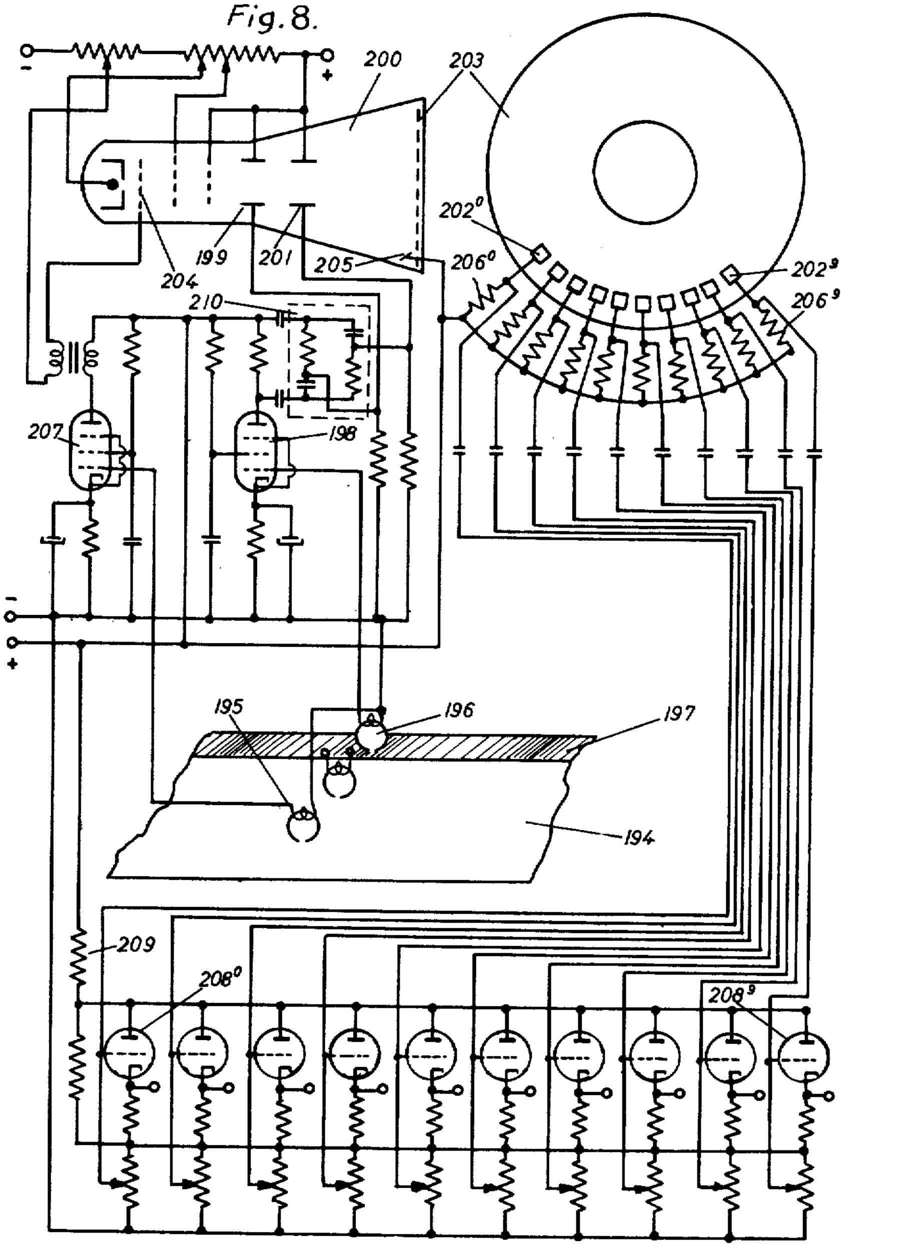
Figure 9:
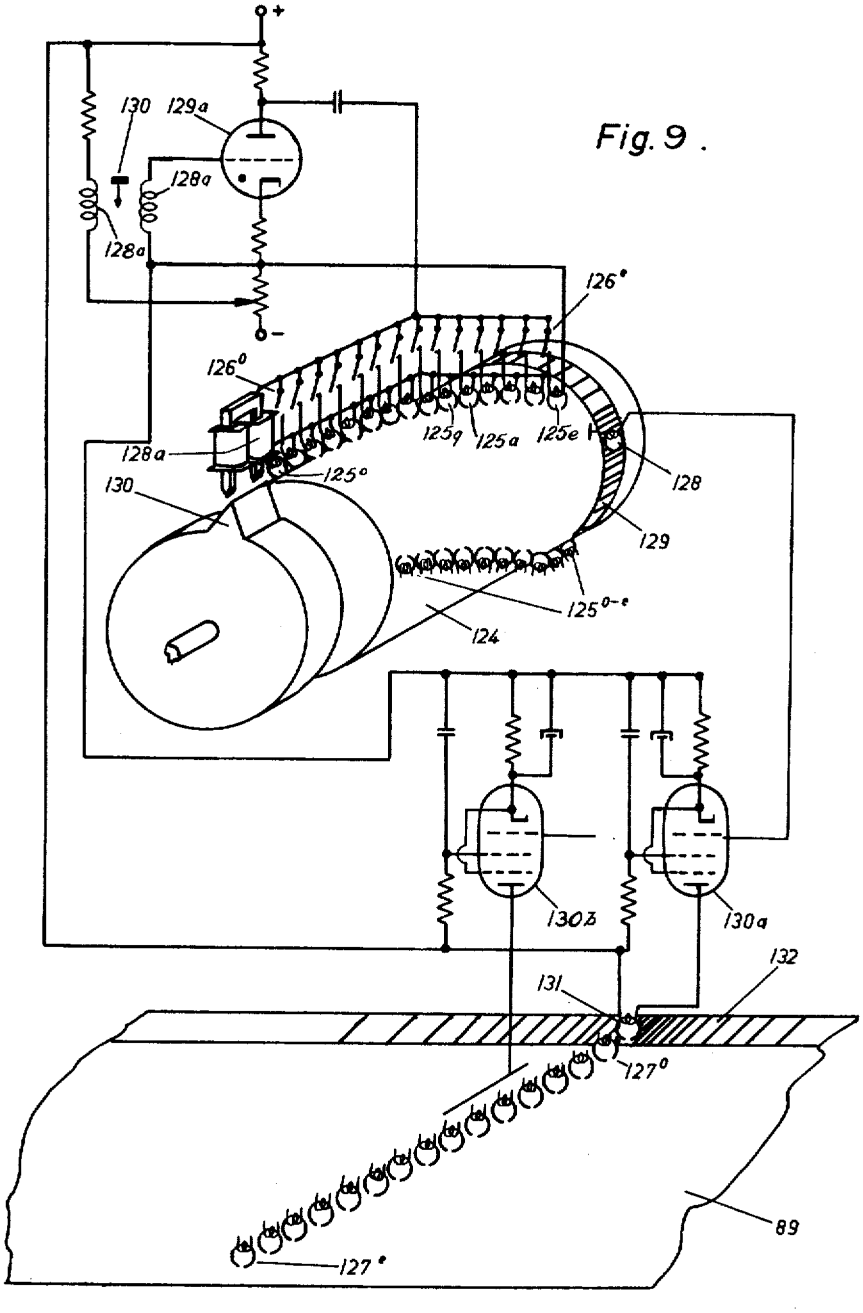
Figure 10A:
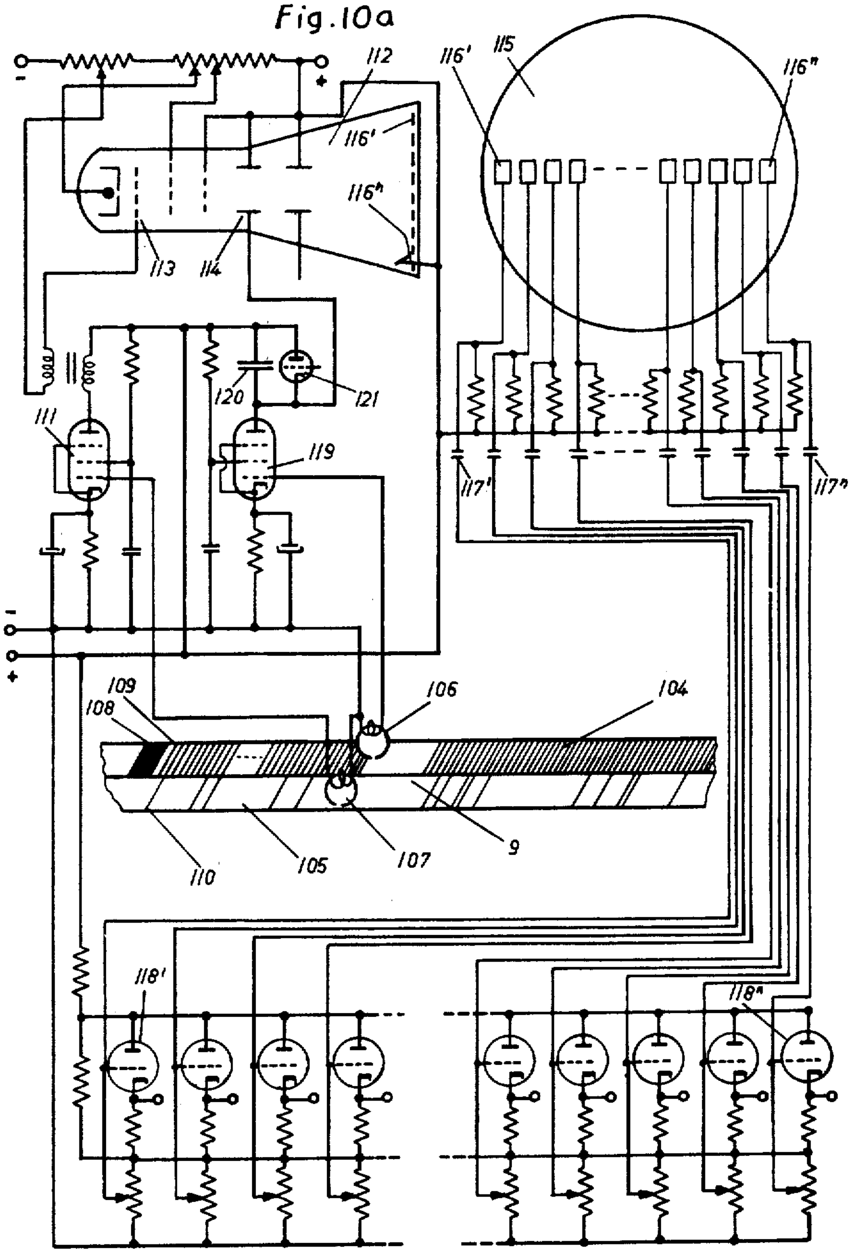
Figure 10B:
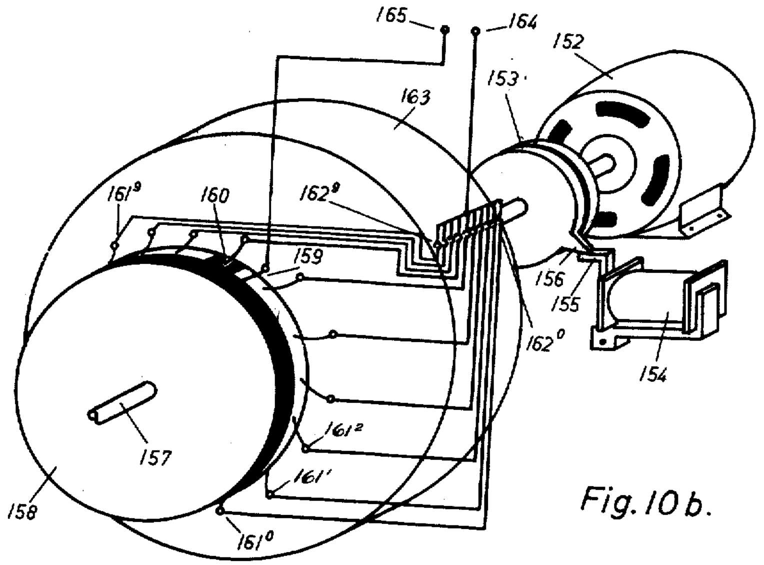
Figure 11C:
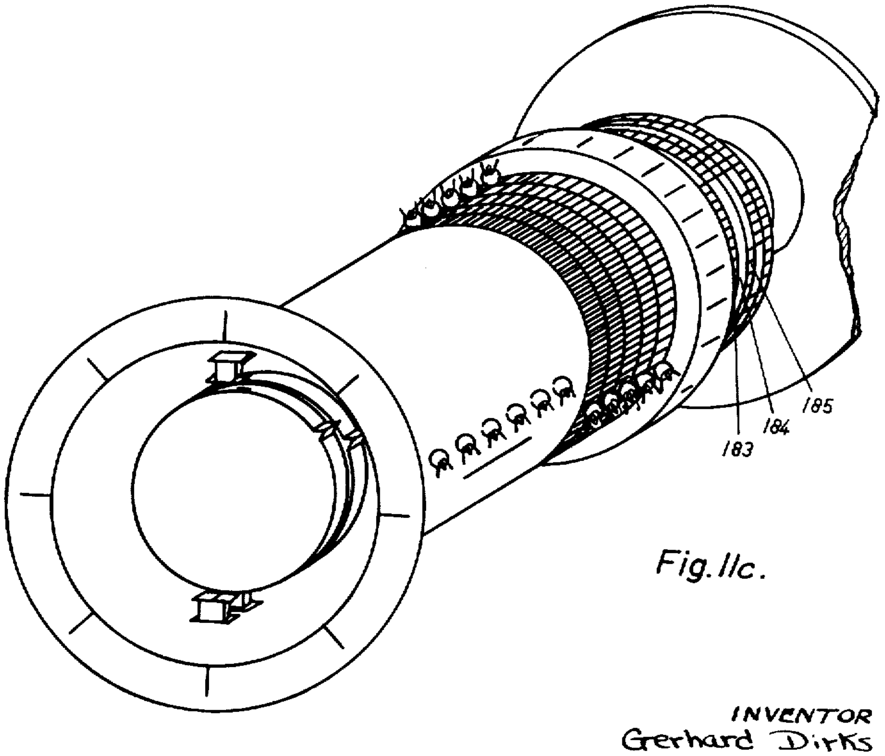
Figure 11A:
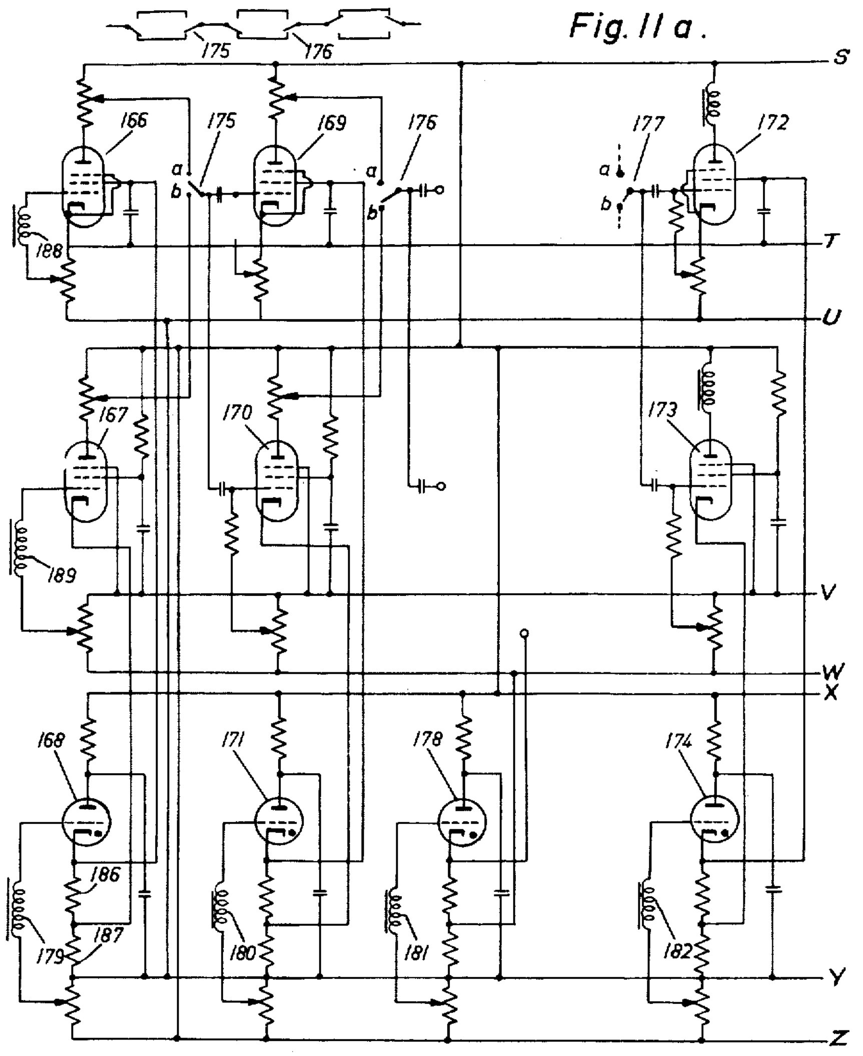
Figure 11:
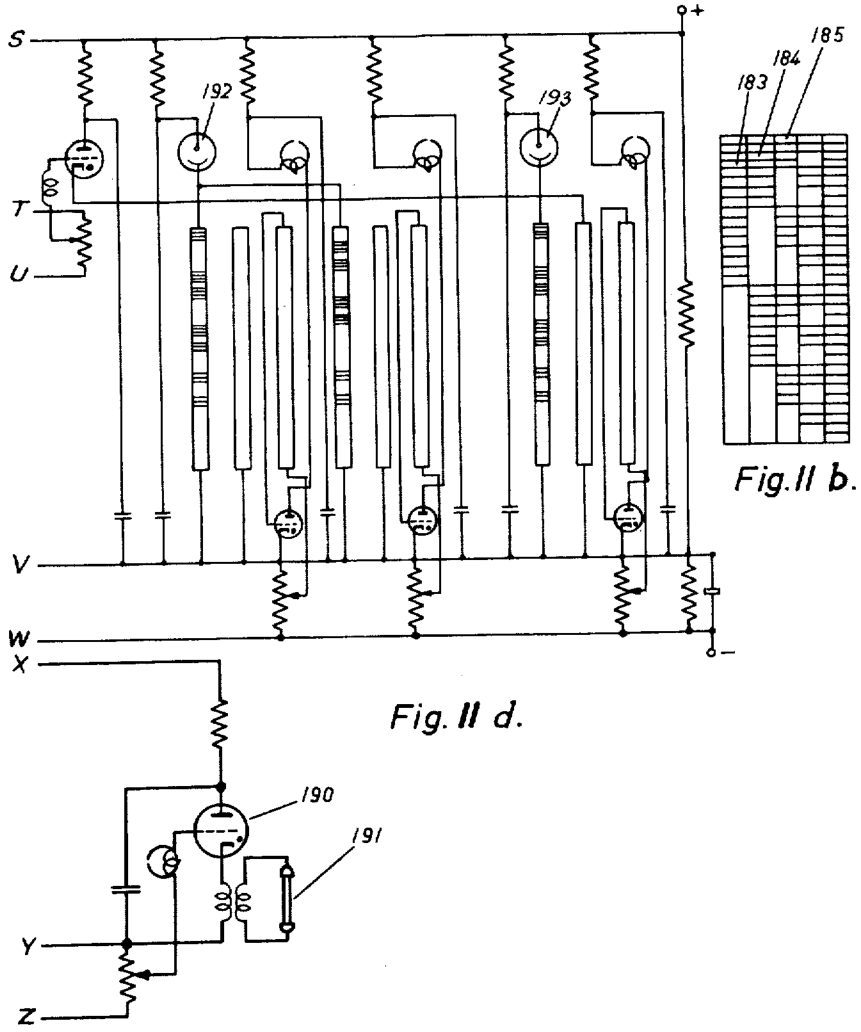

FIGS. 6*a* and 6*b* are circuit diagrams of parts of the selective device;

FIG. 7 shows diagrammatically the cyclic sensing or recording of a group of information signals having definite positions selectively to signals in a synchronizing track of such tape combined with a selective sensing of address or control signals;

FIG. 8 is a wiring diagram showing the control of the deflection of a cathode ray in dependence on synchronizing signals coordinated to record areas of a record means;

FIG. 9 shows a number of signal heads operating in parallel and wherein the signals may be selectively transferred to or from the tape with or without rearrangement, and with the simultaneous transfer of synchronizing and information signals;

FIG. 10*a* is a switching diagram for the control of a set of relay tubes by a stepwisely movable tape or other record means having one synchronization and one information track;

FIG. 10*b* shows a stepwisely operable cyclic storage with magnetizable layer for selective or repeated sensing of signals transferred from the tape of FIG. 10*a* to the said magnetizable record means;

FIG. 11*a* is a schematic circuit diagram of an embodiment of selective comparing means for addresses for binary numbers of several denominations;

FIG. 11*b* is a development of a cylindrical part shown in FIG. 11*a* with means for a binary address in several denominations;

FIG. 11*c* shows in perspective a magnetic drum storage with selective sensing and recording means under the control of signals forming a multi-denomination address;

FIG. 11*d* is a continuation of the embodiment of FIG. 11*a*.

The invention will first be described as embodied in an arrangement for sorting information recorded as signals on a magnetic tape. Such an arrangement is fully described in my copending application Serial No. 498,045, filed March 30, 1955, and now issued as patent No. 2,928,077. Briefly, the information is recorded in "word storage areas," a word storage area being defined as a storage area for a group of information signals having a common factor such that it is desired to transfer or otherwise process such signals as a group. For example, each word storage area may consist of the information originally recorded on a single punched record card or other document. Thus a word storage area generally contains signals representing a plurality of symbols, such as alphabetic characters or digits, etc. The information bearing tape may be sensed and each word storage area having a predetermined symbol in a chosen position to be selected for recording on a second magnetic tape. The process corresponds in essence to the direction of a punched card into a particular pocket of a sorting machine under control of the sensing of the corresponding punching in a particular column. By repetitions of this process, the original information may finally be recorded in a predetermined, e.g. numerical, order.

The position within a word storage area of the signals representing a particular symbol, determines the denominational significance, for example, of the symbol. It will be apparent, therefore, that the sorting arrangement referred to requires selective transfer of signals sensed from a magnetic tape and, in the case of repeated transfer, facilities for synchronization of each transfer so that the positional significance of the symbol representing signals is maintained.

Figure 1:
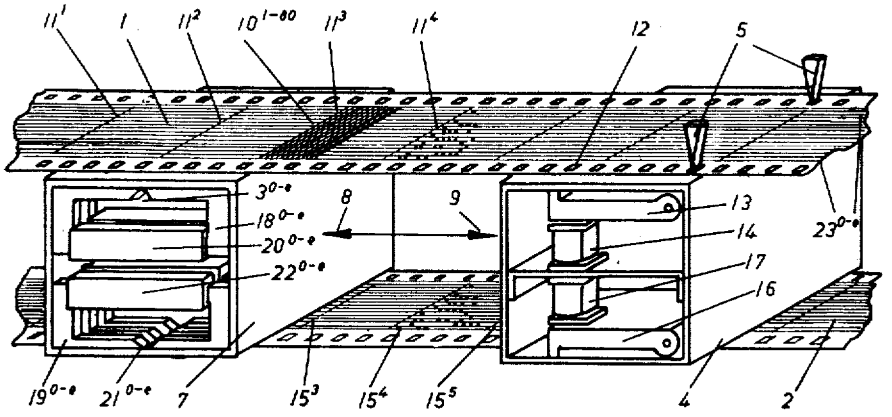
FIG. 1 is a diagrammatic perspective view of selective storage tape with signal heads and conveying means.

FIG. 1 shows in diagrammatic perspective the main parts of a two-tape selective storage mechanism. This arrangement is described in greater detail in my copending patent application Serial No. 498,043, entitled "Storing of Signals," filed March 30, 1955, and now issued as patent No. 2,967,295, with reference to FIG. 5 thereof which corresponds to FIG. 1 of the present disclosure. The selective storage arrangement of FIG. 1 comprises two stepwisely operating tapes 1, 2 for the successive stepwise sensing and recording of signals on magnetic tapes. Each tape system comprises a reel (not shown) from which the tape is uncoiled or unwound, a sensing head system 3 by which the tape 1 is sensed, the tape feeding system 4 with step teeth 5 and a reel (not shown) for rewinding the tape. The sensing and the transport systems are operated in dependence on the movement of the main shaft 6 (compare FIG. 2) driven by a motor (not shown).

The magnetic signal head system 7 moves in each cycle of the operating means from right to left in arrow direction 8 and back in arrow direction 9, over one word storage area, such as $11^1$, $11^2$, and $11^3$, which in this case is eighty denominational storage areas $10^{1-80}$. The tape 1 is stationary during the movement of the sliding signal head system 7 from right to left in arrow direction 8, and is moved a distance equal to one word storage area to the right on the backward movement of the sliding signal head system 7 in arrow direction 9. The movement of the tape 1 by one "area" 11 in arrow direction 9 is controlled by the upper part of the transportation control head 4 which moves synchronously with the sliding signal head system 7 back and forth, corresponding to a certain number of sprocket holes 12 in the tape. Beginning with the reversing point of the movement of the signal head and transport system 7 and 4 in arrow direction 8, and with the backward movement in arrow direction 9, the lever 13 enters into the sprocket holes of the tape, the tape meanwhile being in a fixed position, locked by the registering teeth 5. The magnet coil 14 controls the movement of the tape. The stepwise movement of tape 1 is prevented if the magnet coil 14 moves the transportation lever 13 downwards due to energization of its windings, and lever 13 cannot then move into the sprocket holes 12 of said tape.

The movement of tape 2 is controlled by the lower part of the transport control mechanism 4. It consists, comparable to its upper part, of the transport lever 16 and the magnet coil 17. It can only feed the tape 2 from left to right in arrow direction 9 by one word storage area 15, if the magnet coil 17 does not prevent the lever 16 from engaging a sprocket hole.

The signal head system 7, which moves back and forth in arrow direction 8 and 9, comprises two sets of 15 parallel arranged signal heads $\mathbf{18}^{0-e}$ and $\mathbf{19}^{0-e}$ with their respective gaps $\mathbf{3}^{0-e}$ and coils $\mathbf{20}^{0-e}$, gaps $\mathbf{21}^{0-e}$ and coils $\mathbf{22}^{0-e}$. Each head 18 cooperates with one of the tracks $\mathbf{23}^{0-e}$ of tape 1. On the movement of the sliding signal head system 7 in arrow direction 8, the magnetic signals within all the different tracks $\mathbf{23}^{0-e}$ of a word storage area 11 are sensed within one cycle and those in any of the vertical denomination areas $\mathbf{10}^{1-80}$ (columns) may be selected as address or other control signals and may be used for the selective control of the transfer of the sensed information signals of all the columns of an area 11 on tape 1 to an area 15 on tape 2, for example during the backward movement of the sliding head system.

The heads $\mathbf{19}^{0-e}$ cooperate with tracks on the tape 2 corresponding to the tracks 23 on the tape 1.

The advantage of such a use of stepwisely moved magnetic tapes lies in the facility of recording and erasing, and a repeated sensing of signals in any selected signal positions and sequences during for example, one cycle, and very simple recording, erasing and feeding means. Instead of the sensing and recording being done by the moving of signal heads over a stationary tape, the reverse arrangement may be adopted. Such reverse arrangement has other advantages including that the stationary signal heads allow greater simplicity of construction.

The means for the selective operation of the sensing and/or recording means, and the means for transport of the tape are set forth in more detail in my copending patent application, Serial No. 498,047, filed March 30, 1955, and now abandoned.

Figure 2:
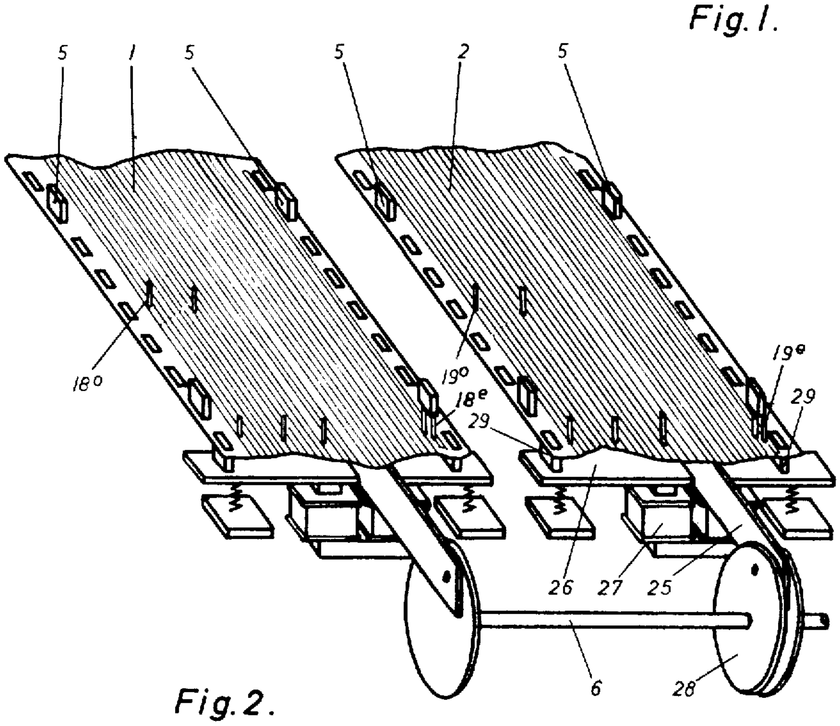
FIG. 2 is another perspective view of such tapes illustrating alternative arrangements of conveying means, etc.

Referring to FIG. 2, there is shown the manner of stepwise feeding and the sensing and recording of one or more tapes controlled independently of each other. From the original tape 1, which is stepwisely fed, a transfer of all the information signals of a word storage area to the second tape 2 is effected only when the first tape may contain in selected denominational storage areas preselected digit values controlling such selected transfer. At the same time, when such a transfer has taken place, the second tape 2 will be moved on by one step, as in this case the bar 25 with the feeder 26 is not held by the core of the magnet coil 27 and the rotating disc 28, on shaft 6, moving the back and forth transport system can pull the tape forward by one step. After this forward movement, the cross bar 26 with its teeth 29 will be pulled out of the corresponding sprocket hole at the edges of the tape, whereupon the tape is held by the registering teeth 5 during the rearward movement of the bar 25. Combined with the up and down movement of the teeth 29 is the up and down movement of the registering teeth 5, having a slanted edge, so that the tape is accurately positioned by means of said registering teeth, and sensing and recording can be effected accurately in the various denominational storage areas. The sensing and recording is effected by means of the sets of sensing, recording and erasing heads $\mathbf{18}^{0-e}$ and $\mathbf{19}^{0-e}$.

Figure 3:
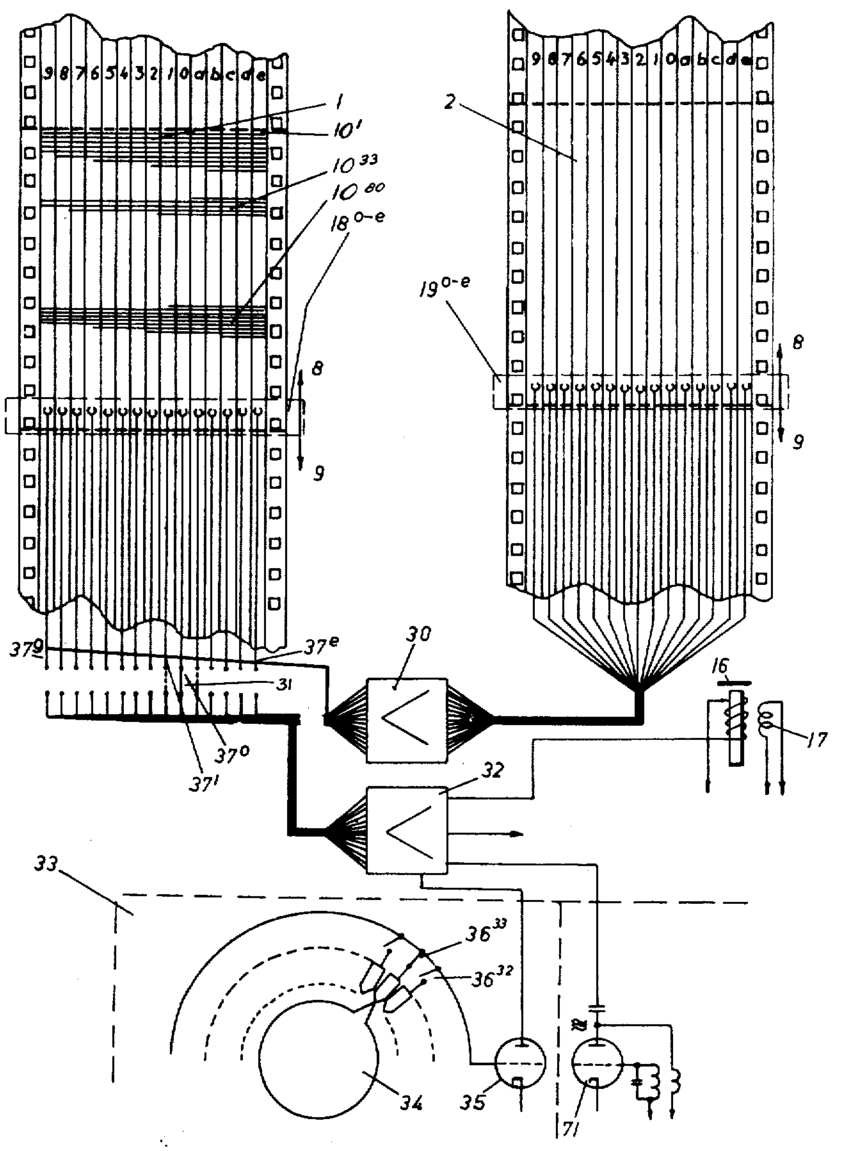
FIG. 3 illustrates diagrammatically the operation of a two tape selective storage device.

FIG. 3 shows the operation of such a two tape selective storage device with tapes 1 and 2 by means of a diagram.

The signal head sets $\mathbf{18}^{0-e}$ and $\mathbf{19}^{0-e}$ are moved over the tapes 1 and 2 in arrow directions 8 and 9. The sensing heads $\mathbf{18}^{0-e}$ are connected with the amplifier 30 and via a selecting stepping switch 31 with the amplifier 32. During the movement of the signal heads in arrow direction 8 the signals of tape 1 are sensed by the set of sensing heads $\mathbf{18}^{0-e}$ and may be transferred or not transferred after amplification in amplifier 30 for recording by means of the recording heads $\mathbf{19}^{0-e}$ on the tape 2 under the control of a selective mechanism. Such selective mechanism may comprise, for example, a selective device for address or other control storage areas, a selective device for sensing such signals, a transfer switching device and a switchable feeding device actuated in dependence on control signals delivered from said selective devices. The selective device for the address or other control storage areas includes the amplifier 32, which is inoperative in its normal position and only rendered operative for a short period by the selective switch 33, including the inductive distributing switch 34 actuating the gas discharge tube 35 selectively as will be described with reference to FIGS. 4 and 5.

In FIG. 3, the switch $\mathbf{36}^{33}$ is shown closed, which makes the windings of the inductive switch effective during the passage of signal heads $\mathbf{18}^{0-e}$ over denominational storage area $\mathbf{10}^{33}$. The selected switch $\mathbf{36}^{33}$ effects the ignition of the relay tube 35 on the passage of the denominational storage area $\mathbf{10}^{33}$ of the magnetizable tape 1 below the sensing heads $\mathbf{18}^{0-e}$, said relay tube being switched off again before the beginning of the passage of the signal heads $\mathbf{18}^{0-e}$ over the next denomination storage area.

The device for the selective control signals includes the switch 31, which may be set for digit values for example, 0–9 selectively, and in combination with the additional signals *a–e* also for alphabetic or other combinations. If, for instance, during a first passage of the tape 1 below the sensing heads $\mathbf{18}^{0-e}$ a transfer of all the information signals from tape 1 to tape 2 is to take place for all word storage areas, having, for example, a zero in the selected control storage area $10^{33}$, this selection is effected by means of a double selection, namely a selected denominational storage and a selected digit value.

If in the switch position $37^0$ for digit value "zero" a signal is sensed during the passage over the selected denomination control column, representing "zero," a selective transfer of all the information signals of the respective word storage area from tape 1 to 2 is effected as the transfer switching device including relay tube 35 is actuated (via terminals 58 as described below with reference to FIG. 6*a*) opening the amplifier channels 30. The magnet 17 is actuated and releases the lever 16, so that the movement of the tape 2 is effected by one word storage area.

If in the denominational storage area $10^{33}$ selected by switch $36^{33}$ a digit value signal corresponding to the selected switch position is not sensed, the amplifier 32 remains ineffective and the lever 16 of the transport system is drawn against the magnet 17.

The aforementioned method for a selective control of signal transfer may also be adopted for address signals involving more than ten digit values or combinations of such ten digit values, if a chain of combination switches operating according to binary or other representation of digits is used for the selective control by comparison as it will be described with reference to FIGS. 10*a* and 10*b*.

Instead of a selected transfer or no transfer of signals, a general transfer via amplifier 30 may take place and a successive selected erasure as shown in FIG. 3, wherein the erasing amplifier 32 is operated as erasing oscillator in dependence on control tube 35 to selectively erase or not erase the recorded information signals which have just before been recorded by a transfer of all the information signals of a word storage area from tape 1 to tape 2.

The selective transfer may alternatively be effected in such a way that in a preceding sensing process the digit values of the selective control column are sensed and used for a succeeding selection control. In dependence on the result of this process the information content of the word storage area is sensed and transferred onto the second stepwisely fed tape. It is possible to effect the selective control of the signal transfer by two sensing processes which are effected simultaneously, of which the one is off-set by one word storage area from the other. On the other hand, the sensing processes may be effected by the same signal head successively. The pre-marking signals for the control of the transfer may be either stored in relay or electronic tube storages or the like, or on the tapes themselves.

An arrangement for effecting selective control of the transfer of signals from tape 1 by means of two sensing processes is described with reference to FIGS. 4 to 7.

Figure 4:
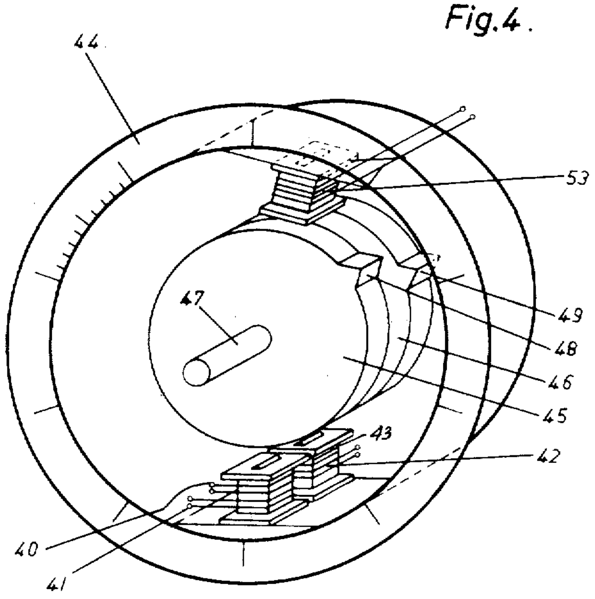
FIG. 4 shows a selection device for sensing selected address or control signals from a group of information signals.

In FIG. 4, there is shown a selecting switch comprising rotatable members 45, 46 mounted on a shaft 47 and having projections 48, 49, respectively. A pair of primary and secondary coils 40, 41 cooperates with the projection 48, and a second pair of primary and secondary coils 42, 43 cooperates with the projection 49. Other coils at 53 cooperate with the projection 48. All these coils, as shown in this arrangement, are adjustable around the shaft 47; said coils being carried on the ring 44 on which is marked a scale indicating the selected column position.

Instead of one adjustable coil arrangement there may be also a circular arrangement of such pairs of coils, which may energize selectively in dependence on control signals as described in my copending patent application, Serial No. 498,047, filed March 30, 1955, and now abandoned.

Figure 5:
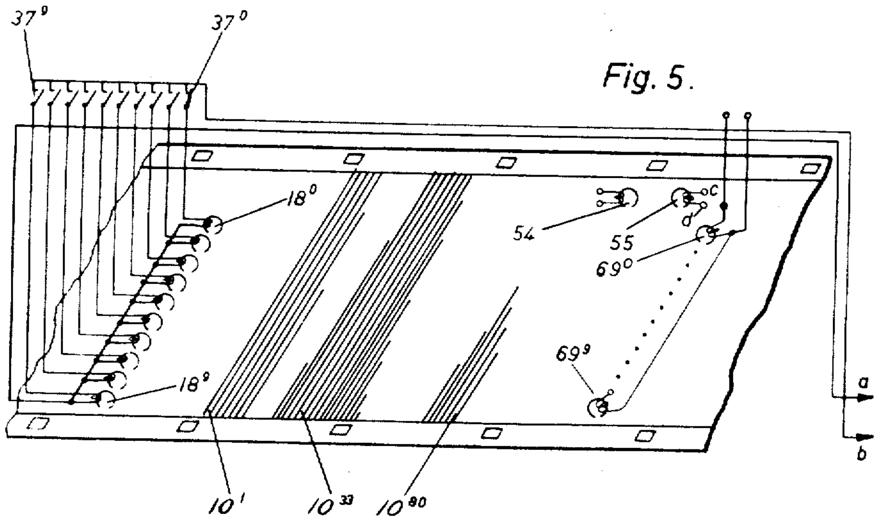
FIG. 5 shows diagrammatically the cyclic sensing or recording of a group of information signals on such tapes combined with a selective sensing of address or control signals.

In FIG. 5, the sensing heads $18^{0-9}$ are shown, which selectably introduce signals via the switches $37^{0-9}$ and leads *a*, *b*, to the electronic selecting gate comprising the discharge tubes 35 and 38 and the pentode 39 of FIG. 6*a*.

The denominational storage area according to which the transfer of information signals is to be controlled, is selected by means of the coils 40, 41 and 42, 43 by a rotational adjustment of those coils within the ring 44.

If the primary winding 40 of a coil is excited by means of direct current, the tube 35 is made operative at the passing of the projection 48 over the core of that coil, since the secondary winding 41 of said coil is connected to the control grid of the tube 35. The passage of the projection 48 past the core of the coil produces an abrupt change in the reluctance of the magnetic flux path and consequently a pulse is induced in the secondary winding 41. The ignition of the tube 35 renders pentode 39 operative, as the voltage drop across cathode resistance 50 of the tube 35 supplies the screen grid voltage of the pentode.

After an interval almost equal to the time for sensing one denominational storage area, the projection 49 of disc 46 passes the core of the coils 42 and 43, and the tube 38 is ignited by the pulse applied to the grid by the coil 43, which renders pentode 39 inoperative by making the cathode potential of pentode 39 positive in relation to the potential of the suppressor grid thereof.

It should be noted that after a denominational storage area has been selected, it must be ascertained which digit value (if any) is recorded in such area, and such digit value must control recording of a pre-mark for the next sensing stage. This recording may be done either in an electronic storage such as, for example, electronic tubes, or on the tape itself. The latter alternative is illustrated diagrammatically in FIG. 5, and in further detail in FIG. 7.

In FIG. 5, the principle of operation is shown for the first sensing of the tape. Switch $37^0$ is closed, so that the digit value "0" is used as a selecting signal. Further selections according to other selecting signals may be effected with the same arrangement by means of further sensings of tape 1 with a change of the selective switching position of switch 31 from $37^0$ to position $37^1$, $37^2$, etc. for each sensing.

Since the control grid of pentode 39 (FIG. 6*a*) is connected only with that one of the sensing heads $18^{0-9}$, which is switched on via the corresponding switch $37^{0-9}$ (that is, the switch $37^0$ in the case shown) only those signals can be made effective via the pentode 39, which correspond both to the selected denominational storage area as determined by the position of the coils 40, 41 and 42, 43 (i.e. area $10^{33}$) and to the selected sensing head $18^{0-9}$ (that is, signal head $18^0$ in the case shown).

If such a signal is sensed from the selected denominational storage area, it operates the gas discharge tube 51 via the pentode 39 (operative only during the sensing of this area $10^{33}$) and thereby renders the pentode 52 operative. The control grid of the pentode 52 is connected with secondary winding 53 and the recording head 54 is connected in the plate circuit of said pentode. The voltage drop across the cathode resistor of the tube 51 provides screen voltage for the pentode 52 to render it operative.

By this means, an indicating mark is recorded in the first or other preceding columns of the same word storage area, indicating that the signals of this word storage area must be transferred at the next sensing stage. In FIG. 5, the tape moves from left to right. The recording head 54 is energized to record a signal when a pulse is induced in coil 53 by the passage of the projection 48 past the core thereof.

By this process, a relatively high speed of the tape can be attained, as the movement of the tape can take place during the backward movement of the transport systems. By means of this pre-marking for the indicating and controlling of a transfer, such transfer can be effected directly, without making a transfer which may later have to be erased. The pre-marking signal is sensed by means of the signal head 55, which is connected with the control grid of the pentode 56 via the connections *c*, *d*. The amplified signal effects the operation of tube 57 to provide a control potential at terminal 58, which potential is applied to the amplifier 30 (FIG. 3) to allow transfer of the signals of a word storage area to take place.

Instead of having the possibility of transfer to only one tape it must be understood that with, for example, a multitape sorter there may be for instance ten different tapes to which transfer is possible, any one of which can be selected as aforedescribed.

The selection of the sorting tape to which a transfer of signals is to be made is then controlled by a corresponding plurality (such as, for example, 10) of amplifier and relay circuits similar to the one shown in FIG. 6*a* and comprising pentode 56 and discharge tube 57. Such a plural arrangement, having for instance ten selecting possibilities, is shown in FIG. 6*b*, having the pentodes $74^{0-9}$ and discharge tubes $75^{0-9}$. The control grids of the pentodes $74^{0-9}$ may be controlled directly by the sensing head series $18^{0-9}$, respectively, without the intermediate switches $37^{0-9}$, the pentodes being made operative only during the passage of said sensing heads over the selected denomination storage area by the aforedescribed means.

The selecting switch 76, shown symbolically in FIG. 6*b*, is arranged to render the pentodes $74^{0-9}$ operative only during sensing of the selected denomination storage area; that is, it performs the function of the tubes 35 and 38 of FIG. 6*a*. Switch 78 may be used for extinguishing the discharge tubes $75^{0-9}$ after they have been ignited, if said switch is moved from the position shown.

When the switch 78 is in its other position, the selected signals amplified in pentodes $74^{0-9}$ may be recorded by the recording heads $73^{0-9}$ in the appropriate position on the magnetic tape itself, without using the relay tubes $75^{0-9}$, if the sets of signal heads $18^{0-9}$, and $73^{0-9}$ are separated by an appropriate distance.

In the example illustrated in FIG. 7, and in contrast to that shown in FIG. 5, an additional sensing head 59 effects, via the coordinated pentode 60 and a phase shifting device, the circular rotation of the cathode ray in the electronic distributor 61. The denominational storage area according to which the selection is to be effected, is determined by the connection of the high value resistance 62, which may be one of a plurality provided for selection of the corresponding denominational areas, and which operates the gas discharge tube 63, when the transfer of information signals is to take place. The tube 63 renders the pentode 64 operative. The pentode 64 derives its screen grid voltage from the cathode resistance of the tube 63. The pre-marking signal itself, which indicates that the transfer of information signals is to be effected, and which is recorded by the recording head 54, will be developed across resistance 65. Only that one of the signal heads $18^{0-9}$ can be effective via the cathode ray distributor, which can apply signals to the control grid of the pentode 66 via a closed switch $37^{0-9}$. The description of FIG. 5 should be considered in relation to this feature.

A transformer 67 is connected in the plate circuit of the pentode 66. The transformer 67 transfers the signals to the control grid 68 of the cathode ray tube 61 and thereby controls the intensity of the cathode ray.

A transfer of information signals from the sensing heads $69^{0-9}$ via the coordinated pentodes $30^{0-9}$ to recording heads $19^{0-9}$ of another magnetic tape is only effected, if at the beginning of the sensing of a word storage area the tube 70 has been rendered operative by pre-marking signals which have already been recorded on the tape 1 and which have been sensed by the sensing head 55 and amplified by the pentode 72.

After each sensing process of the tape 1, said tape is moved forward by one word storage area by means of the transport system. The tape 2 to which the information signals have been transferred is moved on by one word storage area as aforedescribed. The control of the transport system is also effected by the discharge tube 70, influencing the respective transport system via magnet 17.

The series of signal heads $18^{0-9}$ and $69^{0-9}$ may be replaced each by one signal head if electronic distributor means or the like is used, operating in dependence on signals in the synchronizing track sensed by signal head 59.

The different denominational storage areas thus have a fixed relationship to the synchronizing signals sensed by the head 59.

Referring to FIG. 8, signal head 196 senses a synchronization signal of tape 194 recorded in track 197 and supplies the sensed synchronization frequency to the control grid of cathode ray tube distributor 200.

The amplified frequency, if a sawtooth effects horizontal linewise deflections, or, if a sinusoid, as shown in FIG. 8, effects a circular deflection of the cathode ray. The control frequency is fed to the deflecting plates 199 of the tube and shifted by 90° relatively to the deflecting plates 201, so that the cathode ray rotates in definite position to the phase of the control frequency. As a modification, instead of artifically shifting the phase, two separate control frequencies, off-set by 90°, could be recorded. By this means the distributor is independent of any mechanical part and can easily be synchronized by sensing previously recorded signals. The sectors $202^{0-9}$ of the sensitive screen will emit secondary electrons, when hit by a cathode ray of sufficient intensity. The intensity is controlled by grid 204 of the cathode ray tube 200. Plate 205 is connected to the secondary emitting sectors 202 via high value resistances $206^{0-9}$ producing a voltage drop across one of these, if secondary electrons are emitted, that is, if the bias of control grid 204 has become less negative when a signal is sensed by signal head 195 and is amplified by pentode 207.

This voltage drop is supplied to the control grid of the corresponding discharge tube 208 and ignites it. After the ignition of one tube, the others will be unable to ignite, if the resistances 209 are of the correct value, and only that one of the gas tubes is ignited which corresponds to the timing position of the sensed signal. The extinction of the discharge tubes is effected at an exact time instant, for example, by means of a negative impulse to the control grid of a pentode (not shown), cutting off the plate current of said pentode and thus the anode voltage of the discharge tubes $208^{0-9}$.

If, for instance, signal transfers are to be effected from a continuously moving tape to signal carriers having a movement relative to the tape, such as, for example, signal head systems of magnetizable, rotating discs, the reliability of the transfer is independent of mechanical tolerances.

Referring now to FIG. 9, a selective transfer from a record means in the form of a drum to a tape, or the reverse, is shown. Both record means shown have corresponding synchronizing tracks 129, 132 in which signals transferred from one and the other have the same defined relationship to information signals transferred selectively from the one record means to the other. This relationship between synchronizing signals and information signals is preferably obtained when both signals are transferred at the same time.

FIG. 9 shows a recording device in which the signals are recorded at first on a magnetizable drum, disc or the like. The recording heads $125^{0-9,\ a-e}$ are connected with the keys $126^{0-9,\ a-e}$ of the keyboard. The coils **128*a* and discharge tube 129*a* in connection with the magnetic yoke 130 operate to control energization of the heads 125. The transfer of signals and of control frequencies from the drum 124 to the tape 89 is effected selectively under any desired control, for instance in dependence on a selected operation of switches $126^{0-9}$ for a selection of tracks and a selection inductive operation of an inductive switch 128*a*, 130**, for selection of denominational storage areas within the selected tracks.

The signals are sensed by sensing heads $125^{0-e}$ and transferred via signal heads $127^{0-e}$ and pentode **130*b* to the tape 89, whereas the control frequency is sensed by signal head 128 and transferred via pentode 130*a* and signal head 131** to the synchronization track of the said tape. This arrangement is described in more detail in my copending patent application Serial No. 498,047, filed March 30, 1955, and now abandoned.

FIG. 10*a* shows by means of a schematic circuit diagram the control of gas discharge tubes in dependence on information signals contained in one track 105 of a magnetizable tape. Synchronizing signals are contained in synchronizing track 104. Such synchronizing track may be a second magnetizable track on such tape or optically sensible synchronizing marks.

The magnetizable tape of the arrangement of FIG. 10*a* has one information track 105 sensed or recorded by signal head 107 and a magnetizable synchronizing track 104 in which the signals are sensed or recorded by means of signal head 106. The arrangement is shown operative for sensing. The synchronizing track 104 contains magnetized areas the beginning of which may be indicated by a start signal 108 and the ending of such an area may likewise be indicated by a stop signal (not shown), which would be situated at the right hand side of the tape shown in FIG. 10*a*.

Such synchronizing signals for start and stop may be used in the same manner as start and stop signals in teleprinting systems.

The arrangement of FIG. 10*a* illustrates an example of the recording of signals on a tape which is comparable in effect to a punched card. Each word storage area of the tape beginning at start signal 108 on the left side and ending at the not shown stop signal on the right side is to contain all the signals of a punched card, such as, for example, an 80 column punched card. The values are so recorded that the sensing of all the columns of the digit value "9" takes place first and is followed by the sensing of all the columns of digit value "8," then follows digit value "7" and so on, comparable to the passage of the index point rows of a punched card below sensing brushes. To demonstrate the relation between information signals and synchronizing signals there is shown in FIG. 10*a* within the area $109^{1-n}$ a group of synchronizing signals one for each column and wherein the whole group of columns $109^{1-n}$ corresponds to the line "9" of a punched card. Instead of holes which would be used on punched cards, information signals 110 in the information track of the tape are coordinated to those synchronizing signals $109^{1-n}$ which correspond to the column in which a hole would be punched in a punched card. In FIG. 10*a* such information signals 110 are contained within the columns $109^{2}$, $109^{9}$, $109^{11}$ etc. of track 105 indicating that a "9" is recorded within the columns 2, 9, 11 and so on.

After a space in which no information signals will be recorded and which corresponds to the moving on of a punched card from one horizontal row to the following horizontal row, a synchronizing signal area is provided to indicate the columnar significance of information signals within track 105 representing the digit value "8." In this case, signals for the digit value "8" are shown in columns 4, 6 and so on.

There is provided a stepwise control of the transport means of such tape in the manner described in detail in my copending patent application Serial No. 498,047, filed March 30, 1955, and now abandoned. It is a special feature of the present invention that by the use of synchronizing signals coordinated to indicate the timed or local position of information signals for columns of digit values, a stepwise transport of such tape may be effected without losing the advantage of using synchronizing signals. Another advantage is the easy duplicating possibility for control, duplicating, sorting, selecting tasks, and so on, as only two tracks have to be sensed and transferred.

The operation of the sensing arrangement is shown in FIG. 10*a* with electronic distributing means controlled by the signals in the synchronizing track 104.. The sensing head for synchronizing signals is connected to the control grid of pentode 119 which will deliver current pulses when operated by signals sensed from the synchronizing track. The capacitor 120 is therefore charged in steps by the pulses. The voltage across the capacitor is applied to a deflecting plate 114 of the cathode ray tube to deflect the electron beam from targets $116^{1}$ to $116^{n}$ on screen 115 step by step. There may be 80 electrodes $116^{1-n}$, or there may be 10 electrodes used repeatedly eight times for 80 columns. The discharge tube 121 is to discharge the capacitor 120 after each cycle of deflection.

Gas discharge tubes $118^{1}$ to $118^{n}$, for example, 80 gas discharge tubes, may be controlled by the information signals within track 105. At the passing of the information signals below sensing head 107 such signals are amplified in pentode 111 to deliver signals to the control grid 113 of the cathode ray tube 112. If, for instance, information signal 110 corresponding to column 2 of the synchronizing area $109^{1-n}$ is sensed by signal head 107 the cathode ray deflected by the deflection system 114 has reached the target $116^{2}$, so that the amplified information signal delivered to control grid 113 allows beam current to flow to the target $116^{2}$. This produces a voltage across the load which effects via coupling capacitor $117^{2}$ the ignition of discharge tube $118^{2}$, whereas the preceding relay tube $118^{1}$ remains ineffective as within this column no information signal 110 has been sensed. After the running through of the tape through the information area synchronized by the synchronizing signals $109^{1-n}$ all those electronic relay tubes $118^{1-n}$ are ignited which correspond to the columns 2, 9, 11, and so on, in which information signals are contained to indicate "9," as this area of the tape synchronized by the signals $109^{1-n}$ is to contain all the signals for the digit value "9."

During the sensing of the gap, the electronic tubes $118^{1-n}$ are deionized so that within the sub-area of the tape synchronized by the corresponding signals those of the relay tubes $118^{1-n}$ may be ionized anew which correspond to information signals representing digit values "8," and so on.

FIG. 10*b* shows a magnetizable rotatable record means to which the sensed signals from the synchronizing track 104 and the information track 105 may be transferred for a repeated or cyclic use.

Such cyclically operable storage means may be the magnetizable drum 163 fixed on shaft 157. The drum 163 may be driven by motor 152 via a start-stop friction clutch 153 but is normally arrested by engagement at projection 156 with armature 155 of the relay 154. If the relay 154 is energized in dependence on, for example, starting signal 108 (FIG. 10*a*) via an amplifier and with the distributing means known from start-stop teletyping, the friction clutch 153 will rotate the magnetizable drum or disc 163 for one rotation.

The signals of each tape area are recorded in two parallel tracks, namely one synchronizing track and one information track via the signal heads $162^{0-9}$, respectively.

The different modes of making selections in a magnetic storage and for the sensing and/or recording of signals which are set out in detail in my copending patent application Serial No. 498,047, filed March 30, 1955, and now abandoned, may readily be adapted to the present invention.

In a comparison with the combination selection by address signal sequences stored on a magnetizable drum as set out in said copending patent application, in which there could be a mechanical coupling between the selection means and the driving means for the drum, the use of a tape or wire as a signal carrier in a selective storing means permits the combination of a mechanical or electromechanical selecting means, such as, for example, by tape feeding means, with a magnetic, electric or electronic selecting means, and either or both these means may be under the control of one or more comparing devices as in the said copending patent application.

In FIG. 11*a*, of which FIG. 11*d* is a continuation, the leads S, T, U, V, W, X, Y and Z being common to both FIGS. 11*a* and 11*d*, the sensing head 179 of the tube 168 is arranged over the address signal track 183 and sensing head 180 of tube 171 over the address signal track 184, sensing head 181 of the tube 178 over the address signal track 185, and so on (FIGS. 11*b* and 11*c*).

If tube 168 is not operative, the pentode 166 is held non-conducting by a low screen voltage, whereas pentode 167 is conductive. The voltage of the screen grid of pentode 166 is provided by the voltage drop across cathode resistances 186, 187 of the tube 168, whereas the suppressor grid of pentode 167 has the same potential as the cathode of this tube as long as the tube 168 is not operative. As soon as the tube becomes operative, the pentodes 166 and 167 change with respect to their operation, that is, pentode 166 is conductive while pentode 167 is non-conducting, pentode 166 having received its screen grid voltage, whereas the cathode of pentode 167 has become positive with regard to its suppressor grid potential.

Switch 175 is in either position *a* or position *b*, depending upon whether the first element of the address combination requires a "signal" (position *a*) or "no signal" (position *b*) position. The switch 175 may be the contact of an electromagnetic relay or may be a manually operated switch.

Signals sensed from an information storage area by sensing head 188 will pass to the switch 175 only if tube 168 is operative, that is, if pentode 166 is conductive. In position *b* of the switch 175, no signal transmission from sensing head 188 is possible in spite of pentode 166 being conductive, the necessary continuity of the circuit for such sensed information signals being interrupted by means of said switch 175.

The various possibilities for continuity and discontinuity in the signal transmission circuit will be understood from the diagram at the top of FIG. 11*a*, where in each unity of the chain of gates there are two switch elements one of which is comprised by the electronic tubes, for example, the tubes 166, 167, 168 in the first gate shown, and the other of which switch elements comprises switches 175, etc.

Beginning from the left of the arrangement of FIG. 11*a*, information signals entering either chain at the sensing heads 188, 189, pass the first gate of the chain if the electronic switch 166, 167 coincides with the selecting switch 175, which may be pre-set and in the upper position 175*a*, for example. Such coincidence takes place only during that time period of the rotation of the storage when both the switches are in the upper or both said switches are in the lower position, in the case shown, if the electronic switch is in position 166, that is, when pentode 166 is conducting in dependence on the tube 168 being operative. The signals sensed by signal head winding 188 arrive at the grids of the pentodes 169, 170, which grids are connected in parallel via capacitors.

The sensing heads 188, 189 are separate windings of a single head.

Information signals sensed by the sensing heads 188, 189, after having passed through the chain of combination switches may be transferred to another storage device, which may be magnetizable storage, or a relay tube storage, or a cathode ray storage, the deflection of the cathode ray being in synchronism with the original storage in dependence on synchronizing signals sensed from that storage or from another signal generator, which controls the relative movement between the storage and the sensing means.

When a transfer to another magnetic storage is to be effected, synchronizing signals for the information signals will be taken either from the same track in the information storage, for example, start-stop signals or distributing pulses for one or more digit values and/or denomination values, or from a separate synchronizing track the signals in which have a defined position relatively to signals in the information track.

In cases where only a slow relative movement will be required between the magnetizable storage and sensing means or a stepwisely controlled relative movement is used, operative only intermittently, the signal heads may have a direct contact with the surface of the storage in order to increase the storing capacity per unit area of the storage surface.

The same switchable selection conditions obtain in each successive gate in the chain. For example, in the second gate illustrated, the pentode 170 is conductive since tube 171 is not operative and coincident with the relay switch 176 which is in the lower position shown, so that the signals are passed to the third gate of the chain, and so on.

With a 5-stage binary selection device there are in each cycle of operation 32 ($2^5$) possibilities of selecting different areas within each track of the storage each area containing multi-column information in for example 50–100 column positions. If one fourth binary stage is added to the selection device, the number of selection possibilities would be 64 ($2^6$).

For an easier understanding of the method of selection the tube 168 is shown as a gas discharge tube with a capacitive anode load operating so that the pentode 167 is rendered operative only for the minimum period between successive signals. The information signals induced in signal heads 188, 189 are always effective at a position corresponding to the middle of such an interval.

Within the second group of pentodes 169, 170 controlled by tube 171 the same process takes place; that is, the signals transmitted by signal heads 188 and 189 are only further transmitted if tube 171 is nonoperative (when pentode 170 is conductive and the switch 176 is in position *b*).

According to FIG. 11*b*, the control of the alternate opening and blocking of pentodes 166, 167 is shown by way of example as a signal sequence illustrated diagrammatically at 183. Pentode 166 is understood to be conducting during the period represented by the upper half of the track 183 in each rotation and non-conducting during the period represented by the lower half. That is, pentode 166 is conductive during the first 180° of one rotation, whereas during the next 180° of a rotation, pentode 167 is conductive. Similarly, pentode 169 is conductive and pentode 170 is non-conductive from 0 to 90° and from 180° to 270° in each cycle of track 184, whereas it is non-conductive and pentode 170 is conductive from 90° to 180° and from 270° to 360° in each cycle.

The automatic opening and closing of the electronic switches during each cycle brings about the combination of automatically opened and "blocked" switches with the preset positions *a* and *b* of the switches 175, 176, 177 or corresponding electronic or other relays, switching panels, keyboard contacts or the like.

To avoid a too strong amplification of the signals produced in the sensing heads 188 and 189 transmission to the control grid of the next tube is provided by means of a tapping of the respective anode resistor. In the drawing, only the first two and the last of the chain of switches is shown.

There may of course be any number of selection groups in the chain. Thus, only those signals from the sensing heads 188 and 189 are transmitted through the whole chain of selection group switches, when the electronic switches, in combination with the position of the preset switches, establish a continuous circuit.

In the moment at which the combination of the switches 175, 176, 177 and so on corresponds to the sensed combination of signals the information signals pass from the sensing head 188 or 189 through the chain to control further means, such as converters for dot and line printers and the like as set forth in my copending patent application Serial No. 498,055, filed March 30, 1955, and now issued as Patent No. 2,982,951.

It will be apparent that the arrangement will operate to select signals from a required address on a track whether that track is on a magnetic drum or a magnetic tape.

What I claim is:

1. In a selective magnetic storage device, in combination, an elongated magnetizable signal carrier having a plurality of tracks divided into consecutive sections designated to be word areas, each subdivided into denominational areas extending transversely of said carrier for carrying character-representing signals therein; sensing and recording means for cooperation with said signal carrier and including a plurality of signal heads arranged along a line extending transversely of said carrier and respectively associated with said tracks; moving means for producing a step-wise controllable movement of said signal heads relative to said carrier in the longitudinal direction thereof over a plurality of denominational areas in one step of movement, for causing said signal heads to traverse sequentially a plurality of denominational areas; electronic storage means connected in parallel to the respective signal heads; electronic switching means for selectively controlling the transfer of signals to said electronic storage means through said signal heads to and from said carrier during said movement, said electronic switching means being advanced successively in switching condition under the control of signals provided by said signal heads upon the occurrence of the denominational areas under corresponding signal heads; comparing means; and means for transferring signals between said comparing means and said sensing and recording means in dependence on the results of the comparison in said comparing means between signal sequences derived from the signal carrier and signal sequences from another source.

2. In a selective magnetic storage device, in combination, an elongated magnetizable signal carrier having a plurality of tracks divided into consecutive sections designated to be word areas along the length of said signal carrier, each subdivided into denominational areas extending transversely of said carrier for carrying character-representing signals therein; sensing and recording means for cooperation with said signal carrier and including a plurality of signal heads arranged along a line extending transversely of said carrier and respectively associated with said tracks; moving means for producing at each operation an intermittent step-wise controllable movement of said signal heads relative to said carrier in the longitudinal direction thereof over a plurality of denominational areas in one step of movement, for causing said signal heads to traverse sequentially a plurality of denominational areas to generate a succession of electrical signals representing the information in the succession of denominational areas in any one of said tracks; electronic control means operatively connected with said moving means; electronic distributor means interconnected between said signal heads and said electronic control means and operative in synchronism with the said relative movement for selectively controlling the transfer of signals to said electronic control means through said signal heads to and from said carrier during said movement, said electronic distributor means being advanced successively in switching condition under the control of signals provided by said signal heads upon the occurrence of the denominational areas under corresponding signal heads; means for rendering said signal distributing means effective to apply signals derived from a predetermined denominational area to said control means; a second magnetizable signal carrier; second sensing and recording means for cooperation with said second signal carrier and including a plurality of signal heads associated with said second signal carrier; second intermittent moving means for said second sensing and recording means relative to said second signal carrier; and means controlled by said control means for rendering operative said second moving means under the control of a signal sensed from said first mentioned signal carrier.

3. In a selective magnetic storage device, in combination, an elongated magnetizable signal carrier having a plurality of tracks divided into consecutive sections designated to be word areas along the length of said signal carrier, each subdivided into denominational areas extending transversely of said carrier for carrying character-representing signals therein; sensing and recording means for cooperation with said signal carrier and including a plurality of signal heads arranged along a line extending transversely of said carrier and respectively associated with said tracks; moving means for producing at each operation an intermittent step-wise controllable movement of said signal heads relative to said carrier in the longitudinal direction thereof over a plurality of denominational areas in one step of movement, for causing said signal heads to traverse sequentially a plurality of denominational areas to generate a succession of electrical signals representing the information in the succession of denominational areas in any one of said tracks; electronic control means operatively connected with said moving means; electronic distributor means interconnected between said signal heads and said electronic control means and operative in synchronism with the said relative movement for selectively controlling the transfer of signals to said electronic control means through said signal heads to and from said carrier during said movement, said electronic distributor means being advanced successively in switching condition under the control of signals provided by said signal heads upon the occurrence of the denominational areas under corresponding signal heads; means for rendering said signal distributing means effective to apply signals derived from a predetermined denominational area to said control means; a second magnetizable signal carrier; second sensing and recording means for cooperation with said second signal carrier and including a plurality of signal heads associated with said second signal carrier; second intermittent moving means for said second sensing and recording means relative to said second signal carrier; means controlled by said control means for rendering operative said second moving means under the control of a signal sensed from said first-mentioned signal carrier; signal transfer means responsive to signals generated by said first-mentioned sensing and recording means to energize said second sensing and recording means to record signals on said second signal carrier surface; and means controllable by said control means for rendering said signal transfer means effective.

References Cited in the file of this patent

UNITED STATES PATENTS

| | | |
|---|---|---|
| 2,359,617 | Bryce | Oct. 3, 1944 |
| 2,540,654 | Cohen | Feb. 6, 1951 |
| 2,611,813 | Sharpless et al. | Sept. 23, 1952 |
| 2,617,704 | Mallina | Nov. 11, 1952 |
| 2,625,607 | Eckert et al. | Jan. 13, 1953 |
| 2,648,589 | Hickman | Aug. 11, 1953 |
| 2,714,048 | Baird | July 26, 1955 |
| 2,721,990 | McNaney | Oct. 25, 1955 |
| 2,769,592 | Burkhart et al. | Nov. 6, 1956 |
| 2,782,398 | West | Feb. 19, 1957 |